United States Patent [19]
Berndt et al.

[11] 3,862,912
[45] Jan. 28, 1975

[54] PROCESS FOR PRODUCING MEDIUM-TO COARSE-CELL RIGID PHENOLIC RESIN FOAMS OF IMPROVED ABRASION WEAR

[75] Inventors: Heinz Berndt, Eick-Ost; Dragomir Simic, Mulheim-Ruhr; Heinz-Ulrich Zupancic, Duisburg, all of Germany

[73] Assignee: Deutsche Texaco Aktiengesellschaft, Hamburg, Germany

[22] Filed: May 31, 1974

[21] Appl. No.: 475,000

[30] Foreign Application Priority Data
June 30, 1973 Germany.......................... 23334692

[52] U.S. Cl... 260/2.5 F, 260/78.5 UA, 260/78.5 E, 260/78.5 HC, 260/848
[51] Int. Cl............................................ C08g 53/10
[58] Field of Search.................................. 260/2.5 F

[56] References Cited
UNITED STATES PATENTS
2,933,461  4/1960  Mullen ............................ 260/2.5 F

*Primary Examiner*—Morton Foelak
*Attorney, Agent, or Firm*—T. H. Whaley; C. G. Ries

[57] ABSTRACT

Disclosed is a process for producing medium to coarse cell rigid phenolic resin foams having improved abrasion wear by adding to a mixture of phenol-formaldehyde resin, hardening and foaming agent, prior to foaming an additive dispersion consisting of a copolymer of fumaric acid diesters and of a vinyl aromatic compound such as styrene and optionally an olefin such as propylene.

6 Claims, No Drawings

PROCESS FOR PRODUCING MEDIUM-TO COARSE-CELL RIGID PHENOLIC RESIN FOAMS OF IMPROVED ABRASION WEAR

BACKGROUND OF THE INVENTION

1. Field of the Invention

The present invention relates to a process for producing medium- to coarse-cellular rigid phenolic resin foams of improved abrasion wear.

1. State of the Art

The addition of plastic solutions or dispersions to the phenolic resin solution prior to foaming to improve the properties of the produced rigid phenolic resin foam is well known in the art. Thus, it has been proposed, in German Patent Application No. 1,769,927 (Offenlegungsschrift), for the production of finely porous phenolic resin foam, to add polyacrylic acid esters, polymethacrylic acid esters, polyvinylacetate, polyvinylpropionate, polyvinylchloride, and opoxide resin, in dissolved or dispersed form, to the mixture to be subjected to foaming, whereby static stress is improved. In German Patent Application No. 1,694,570 (Offenlegungsschrift), it is recommended for improving the resistance to compression to add polyesters dissolved in styrene. German Patent Application No. 1,569,492 (Offenlegungsschrift) shows that siloxanoxyalkylene copolymers, dissolved in resorcinol used as an additive, act as a foam stabilizer. However, these patent applications do not recognize making improvements in phenolic resin foams, although they mention that rigid phenolic resin foams, in particular medium- to coarse-cellular foams, exhibit only poor abrasion wear.

SUMMARY OF THE INVENTION

The main object of the present invention is to provide a process for producing medium- to coarse-cellular rigid phenolic resin foams of improved abrasion wear.

Other objects will be in part obvious and in part disclosed hereinafter.

Unpredictably in accordance with the present invention it was discovered that rigid phenolic resin foams of medium- to coarse-cellular structure and of substantially improved abrasion wear can be obtained by adding to the mixture comprising an alkaline condensed phenol-formaldehyde resin solution, curing agent and a foaming agent, prior to foaming an additive comprising an aqueous dispersion of a copolymer of fumaric acid diesters with vinyl aromatics and, optionally polymerizable olefins with 2 to 8 carbon atoms.

The additive comprises from 5 to 30 percent, preferably from 10 to 20 percent, of dispersed solids based on the solids content of the phenolic resin solution. The fumaric acid diester-copolymer dispersion used in this process is produced preferably according to German Patent No. 1,949,497. According to the process of this patent a mixture of monomers of the composition set forth below is subjected to copolymerization:

a. from 50 to 90 parts by weight of fumaric acid diesters of tertiary and/or secondary aliphatic alcohols having from 3 to 6 carbon atoms, b. zero or from 1 to 10 parts by weight of an olefin having from 2 to 8 carbon atoms, c. from 3 to 25 parts by weight of a vinyl compound, d. from 5 to 20 parts by weight of fumaric acid diester of a primary aliphatic alcohol having from 4 to 8 carbon atoms.

A few of the features and advantages appertaining to the invention are that the rigid phenolic resin foams with medium- to coarse-cellular structure obtained by the practice of the invention not only exhibit substantially improved abrasion wear but also show increased adhesion, particularly to concrete, and greater fireproofness.

The phenolic resin charge solution used is an alkaline condensed aqueous phenol-formaldehyde resin solution having a phenol-to-formaldehyde mole ratio of about 1:1.1–3 and a viscosity of about 1000 to 6000 cps, preferably from 1500 to 4000 cps, at a solids content of from about 70 to 80 percent, preferably from 72 to 74 percent.

Suitable curing agents include all those known to be suitable for use in phenolic resins. Phenolsulfonic acid, paratoluene sulfonic acid and a mixture of 37% hydrochloric acid and ethyleneglycol in a weight ratio of 1:1 are preferred.

The blowing or foaming agents contemplated according to this invention include conventional foaming agents, in particular pentane, tri-chloro-fluoromethane, isopropylchloride, methylenechloride, and mixtures thereof.

In practice of the process of the invention the phenol-formaldehyde resin solution, the foaming agent, the aqueous copolymer dispersion, and the curing agent are mixed with stirring and allowed to foam at room temperature. The foaming may take place in a unit operating continuously or in molds, preferably in conventional mold cases.

The data below indicating average cellular structure diameters define for the purposes of the invention fine, medium, and coarse cellular foams:

fine cellular structure: up to 1 mm
medium cellular structure: 1 to 2 mm
coarse cellular structure: above 2 mm The pore size of the final product will depend on the amount of copolymer, curing agent and foaming agent, and on the type of foaming agent.

The rigid phenolic resin foams obtained according to the invention are suitable for any type of laminating but have proved to be particularly useful in the building industry on account of their extraordinary adhesion to concrete and outdoor dispersion-type rough coatings (outdoor latex paints). The improvements in the medium to coarse-pore rigid phenolic resin foams achieved by the invention are illustrated more clearly in the examples below.

The following examples merely illustrate the present invention but are not to be construed as limiting it. In these examples, the charge stock is a phenol-formaldehyde resin solution having a phenol-to-formaldehyde mole ratio of 1:1.64, said solution being condensed with caustic soda solution to a viscosity of 3500 cps at a solids content of 73 percent.

The copolymer dispersion used in a 50% aqueous dispersion prepared according to German Patent No. 1,949,497 and containing:

| | | |
|---|---|---|
| fumaric acid diisopropyl ester | 365 | parts by weight |
| fumaric acid di-n-butyl ester | 70 | do. |
| styrene | 23 | do. |
| propylene | 42 | do. |
| water | 500 | do. |

EXAMPLE I

Eighteen hundred grams of the above phenolic resin solution was mixed with stirring with 10 volume percent of pentane, 20 volume percent of hydrochloric acid curing agent and 180 grams of the described copolymer dispersion and filled into an 18-liter mold case. Within 10 minutes this solution foamed at room temperature, so as to fill the mold completely. After thirty minutes the foam block was removed from the mold.

EXAMPLE II

Eighteen hundred grams of the phenolic resin solution of Example I was mixed with stirring with 10 volume percent of pentane, 30 volume percent of phenolsulfonic acid as the curing agent and 180 grams of the described copolymer dispersion and the mixture was poured into an 18-liter-mold. Within 4 minutes the mixture had so foamed at room temperature that the mold was filled up. After 15 minutes the foam block was removed therefrom.

An advantage of the foams cured with phenolsulfonic acid and para-toluenesulfonic acid over those cured with hydrochloric acid is that they are non-corrosive to metals.

The great adhesion of the foams prepared according to the invention is noted, for example, from the fact that it is never the seam between the foam and the concrete but the foam alone that is torn. The improvements achieved with respect to flame-proofness also are remarkable. Although one can cause the foam of the invention to carbonize by exposing it to a very hot flame, as soon as the flame is removed, carbonization stops and there is no afterglow.

The improved abrasion wear of the foams according to the invention as compared to the foams prepared by prior art methods is shown in the table below in which the rigid phenolic foams obtained according to the invention illustrated in Examples I and II are compared to those obtained as illustrated in comparative Examples 3 to 8.

The foam used in the comparative Examples was prepared according to Example I, however, the copolymer dispersion was replaced by equivalent amounts of another plastic material or, as in Example 3, omitted without using a substitute.

Abrasion wear properties were tested on the test bench 394 of Messrs. RaFaMa, Dusseldorf, Western Germany. The frictional area covered 100 m². The plunger was 6 cm in diameter and weighed 4.3 kg. The abrasion is measured after 30 lifts of the plunger and expressed in mm.

The compositions of the resins compared were:

| Example | Trade Name | Manufacturer | Type of resin |
|---|---|---|---|
| 4 | Epicote 828 | Deutsche Shell-Chemie | epoxide resin |
| 5 | Palatal p4 | BASF | unsaturated polyester |
| 6 | Polyacrylate Dispersion (AS 2) | Deutsche Texaco AG. | 50% solution |
| 7 | Mowilith DO 25 | Hoechst AG. | polyvinylacetate 54% solution |
| 8 | Mowilith DV | Hoechst AG. | polyvinylacetate 50% solution |

TABLE I

| Example | Addition of plastics | Hardener | Expanding agent | Abrasion in mm |
|---|---|---|---|---|
| 1 | Copolymer dispersion | HCl-hardener | Pentane | 0.5 |
| 2 | Copolymer dispersion | Phenolsulfonic Acid | Pentane | 0.1 |
| 3 | — | HCl-hardener | do. | 6.3 |
| 4 | Epoxide resin (Epicote 828) | do. | do. | 2.4 |
| 5 | Polyester (Palatal P 4) | do. | do. | 3.8 |
| 6 | Polyacrylate dispersion (AS 2) | do. | do. | 1.4 |
| 7 | Polyvinylacetate (Mowilith DO 25) | do. | do. | 2.3 |
| 8 | Polyvinylacetate (Mowilith D V) | do. | do. | 2.2 |

What is claimed is:

1. Process for the production of rigid phenolic resin foams of medium- to coarse-cell structure and of improved abrasion wear from a mixture of a phenolformaldehyde resin solution, a hardener and a foaming agent, comprising adding prior to foaming said mixture, an additive comprising 5 to 30 % of dispersed solids, based on the solids content of the phenolic resin solution, of an aqueous dispersion of a copolymer comprising (a) 50 to 90 parts by weight of a fumaric acid diester of tertiary and/or secondary aliphatic alcohols having 3–6 carbon atoms, (b) zero to 10 parts by weight of a monoolefin monomer having 2 to 8 carbon atoms, (c) 3 to 25 parts by weight of a vinyl aromatic monomer, (d) and 5 to 20 parts by weight of a fumaric acid diester of a primary aliphatic alcohol having 4 to 8 carbon atoms.

2. The process of claim 1 wherein said additive is a copolymer of fumaric acid diesters with at least one aromatic compound and at least one olefin having from 2 to 8 carbon atoms.

3. The process of claim 1 wherein the phenolformaldehyde resin solution has a phenol to formaldehyde mole ratio of about 1:1.1 to about 1 to 3, a viscosity of about 1500 to 4000 cps and a solids content ranging from about 70 to 80 percent.

4. The process according to claim 1, wherein said additive contains from 10 to 20 percent of dispersed solids based on the solids content of the phenolic resin solution.

5. The process according to claim 1, wherein said additive consists of an aqueous dispersion of a copolymer obtained from fumaric acid diisopropylester, fumaric acid di-n-butylester, styrene, and propylene.

6. A rigid phenol-formal-dehyde resin foam of medium to coarse cellular structure and improved abrasion wear comprising 5 to 30% by weight based on the phenol-formaldehyde resin of a copolymerized mixture of:
   a. from 50 to 90 parts by weight of fumaric acid diesters of tertiary and/or secondary aliphatic alcohols having from 3 to 6 carbon atoms,
   b. zero to 10 parts by weight of a monoolefin having from 2 to 8 carbon atoms,
   c. from 3 to 25 parts by weight of a vinyl aromatic monomer,
   d. from 5 to 20 parts by weight of fumaric acid diester of a primary aliphatic alcohol having from 4 to 8 carbon atoms.

* * * * *